US010680911B2

(12) United States Patent
Ramakrishnan et al.

(10) Patent No.: US 10,680,911 B2
(45) Date of Patent: Jun. 9, 2020

(54) QUALITY OF EXPERIENCE BASED NETWORK RESOURCE MANAGEMENT

(71) Applicant: Cisco Technology Inc., San Jose, CA (US)

(72) Inventors: Sangeeta Ramakrishnan, Saratoga, CA (US); Xiaoqing Zhu, Austin, TX (US); John T Chapman, Laguna Niguel, CA (US)

(73) Assignee: Cisco Technology, Inc., San Jose, CA (US)

( * ) Notice: Subject to any disclaimer, the term of this patent is extended or adjusted under 35 U.S.C. 154(b) by 82 days.

(21) Appl. No.: 14/339,601

(22) Filed: Jul. 24, 2014

(65) Prior Publication Data

US 2016/0028595 A1     Jan. 28, 2016

(51) Int. Cl.
*H04L 29/06* (2006.01)
*H04L 12/825* (2013.01)
(Continued)

(52) U.S. Cl.
CPC ...... *H04L 41/5025* (2013.01); *H04L 41/0896* (2013.01); *H04L 41/5067* (2013.01);
(Continued)

(58) Field of Classification Search
CPC ... H04L 65/80; H04L 67/322; H04L 41/5067; H04L 65/4084; H04L 41/509;
(Continued)

(56) References Cited

U.S. PATENT DOCUMENTS

2007/0070890 A1   3/2007 Rojahn
2012/0297430 A1   11/2012 Morgos et al.
(Continued)

FOREIGN PATENT DOCUMENTS

EP    2530870 A1   12/2012

OTHER PUBLICATIONS

Chikkerur et al, "Objective Video Quality Assessment Methods: A Classification, Review, and Performance Comparison," IEEE Transactions on Broadcasting, Jun. 2011, pp. 165-182, vol. 57, No. 2, Piscataway, NJ, US.
(Continued)

*Primary Examiner* — Tom Y Chang
(74) *Attorney, Agent, or Firm* — Merchant & Gould P.C.

(57) ABSTRACT

Previously known network management methods are incapable of concertedly managing respective levels of perceptual playback quality of media content data for a number client devices. In particular, previously known methods fail to regulate ABR-enabled client devices and the like that are each operating to individually consume as much of one or more shared network resources as possible without regard to the degree performance improvements. By contrast, various implementations disclosed herein provide network-centric concerted management of respective levels of perceptual playback quality of media content data on each of a number of client devices. The respective levels perceptual playback quality are concertedly managed by adjusting one or more shared network resources (e.g., bandwidth, processor time, memory, etc.). Adjustments are made in response to an aggregate quality of experience (QoE) metric characterizing a distribution of QoE levels for the client devices sharing the one or more shared network resources.

19 Claims, 10 Drawing Sheets

(51) Int. Cl.
*H04L 12/24* (2006.01)
*H04L 12/917* (2013.01)
*H04L 12/911* (2013.01)
*H04W 28/02* (2009.01)
*H04W 28/24* (2009.01)

(52) U.S. Cl.
CPC .............. *H04L 47/25* (2013.01); *H04L 47/76* (2013.01); *H04L 65/4084* (2013.01); *H04L 65/60* (2013.01); *H04L 65/605* (2013.01); *H04L 65/80* (2013.01); H04L 41/5003 (2013.01); H04L 41/509 (2013.01); H04L 41/5019 (2013.01); H04L 47/822 (2013.01); H04W 28/0268 (2013.01); H04W 28/24 (2013.01)

(58) Field of Classification Search
CPC .............. H04L 41/5025; H04L 41/0896; H04L 41/5003; H04L 41/5019; H04L 47/25; H04K 47/822
See application file for complete search history.

(56) References Cited

U.S. PATENT DOCUMENTS

| 2012/0327779 A1* | 12/2012 | Gell .................... H04L 47/6275 370/238 |
| 2013/0304905 A1 | 11/2013 | Appachiappan et al. |
| 2014/0086073 A1 | 3/2014 | Baykal et al. |
| 2014/0122594 A1 | 5/2014 | Uzunalioglu et al. |
| 2014/0241154 A1* | 8/2014 | Stanwood .......... H04L 41/5022 370/230 |

OTHER PUBLICATIONS

Kim et al, "The QoE Evaluation Method through the QoS-QoE Correlation Model," Networked Computing and Advanced Information Management, Fourth International Conference on, 2008, pp. 719-725, NCM '08, Gyeongju.

International Search Report and Written Opinion of the International Searching Authority for PCT/US2015/041650 dated Nov. 13, 2015.

EP Communications for corresponding 15757022.7 dated Jan. 16, 2018.

* cited by examiner

QUALITY OF EXPERIENCE BASED NETWORK RESOURCE MANAGEMENT

TECHNICAL FIELD

The present disclosure relates to data networks, and in particular, to network management of perceptual playback quality of media content data for multiple client devices.

BACKGROUND

In accordance with known network management methods nominal levels of bandwidth are allocated to client devices. Allocations are often made based on a subscription tier model, within which client devices in each tier receive a respective bandwidth allocation for a corresponding cost. Known quality of service (QoS) metrics for these methods are merely based on assessing whether client devices are provided with data throughput levels associated with the subscription tiers. However, perceptual playback quality of media content data can vary within a subscription tier bandwidth allocation based on characteristics of the media content data. Known network management methods do not manage shared network resources in order to influence perceptual playback quality of media content data items at a client device.

Rather, known methods of managing perceptual playback quality are typically performed by individual client devices. For example, according to adaptive bit rate (ABR) methods, each ABR-enabled client device individually detects and seizes available bandwidth in addition to its nominal allocation, without regard to any noticeable gains in perceptual playback quality of media content data. In the case of video streaming, an ABR-enabled client device requests a higher bit-rate representation of a video stream after detecting available bandwidth. However, the available bandwidth is misappropriated when the higher bit-rate representation fails to provide a substantial gain in perceptual playback quality. The problem is reinforced by previously known methods in at least two ways. First, available bandwidth is claimed on a first-come-first-served basis, which penalizes client devices that cannot or do not act first. Second, existing network management methods fail to regulate client devices that are each operating individually to consume as much of a shared network resource as possible, as is the case with ABR-enabled client devices. Consequently, individual client devices are able to misappropriate portions of shared network resources in a way that has a negative impact on and/or limits the perceptual playback quality of media content on other client devices.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
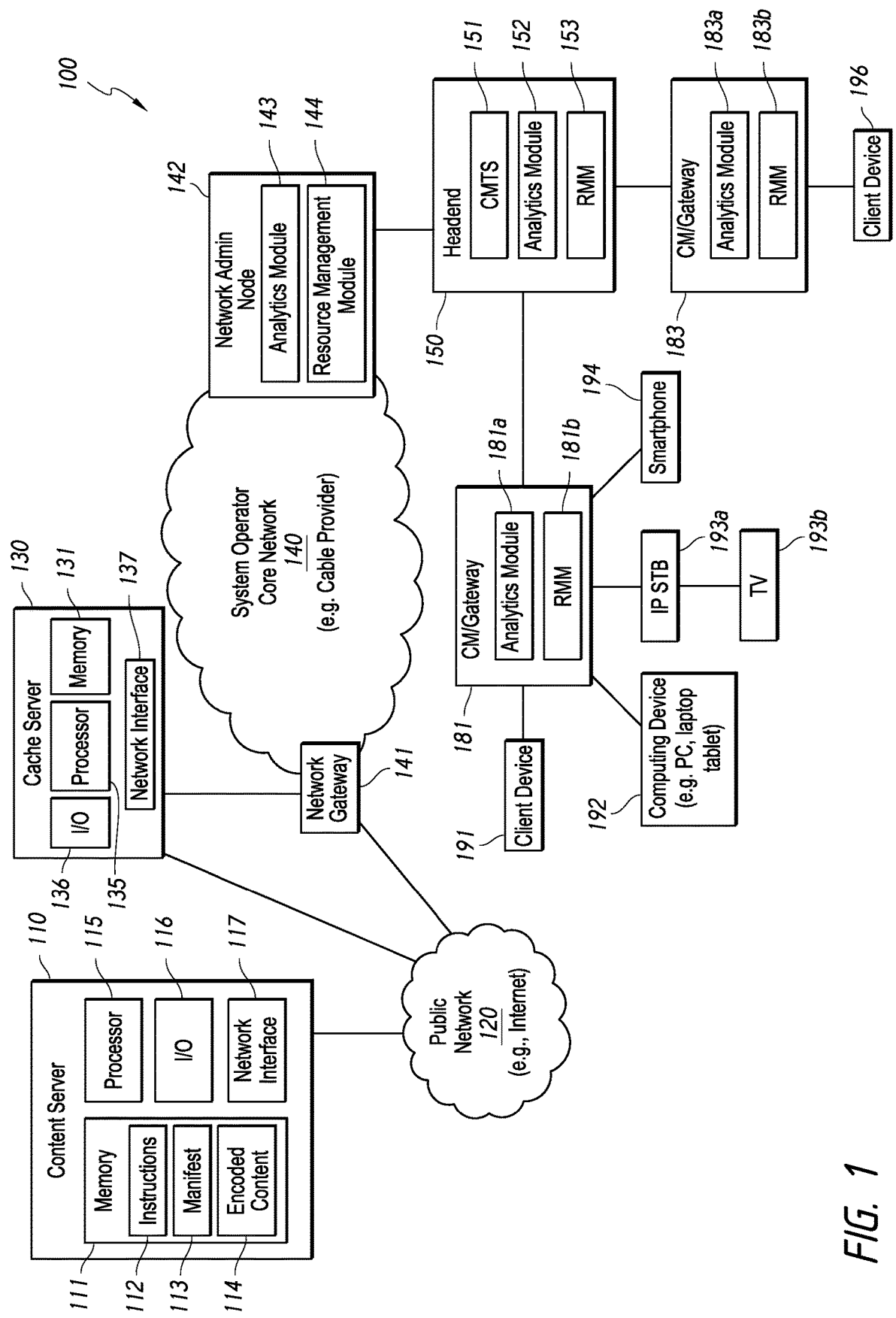
FIG. 1 is a block diagram of a data communication environment in accordance with some implementations.

In accordance with common practice various features shown in the drawings may not be drawn to scale, as the dimensions of various features may be arbitrarily expanded or reduced for clarity. Moreover, the drawings may not depict all of the aspects and/or variants of a given system, method or apparatus admitted by the specification. Finally, like reference numerals are used to denote like features throughout the figures.

DESCRIPTION

Numerous details are described herein in order to provide a thorough understanding of the illustrative implementations shown in the accompanying drawings. However, the accompanying drawings merely show some example aspects of the present disclosure and are therefore not to be considered limiting. Those of ordinary skill in the art will appreciate from the present disclosure that other effective aspects and/or variants do not include all of the specific details of the example implementations described herein. Moreover, well-known systems, methods, components, devices and circuits have not been described in exhaustive detail so as not to obscure more pertinent aspects of the description herein.

Overview

Previously known network management methods are incapable of concertedly managing respective levels of perceptual playback quality of media content data for a number client devices. In particular, previously known methods fail to regulate ABR-enabled client devices and the like that are each operating to individually consume as much of one or more shared network resources as possible without regard to the degree performance improvements. By contrast, various implementations disclosed herein provide network-centric concerted management of respective levels of perceptual playback quality of media content data on each of a number of client devices. The respective levels perceptual playback quality are concertedly managed by adjusting one or more shared network resources (e.g., bandwidth, processor time, memory, etc.). Adjustments are made in response to an aggregate quality of experience (QoE) metric characterizing a distribution of QoE levels for the client devices sharing the one or more shared network resources. For example, in some implementations, a resource management module allocates bandwidth based at least on one of a combination of bit-rates used to accommodate a respective QoE preference level for each client device sharing a network resource, and an aggregate QoE metric for the same client.

FIG. 1 is a block diagram of a data communication environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the data communication environment 100 includes a public network 120 (e.g., a portion of the Internet), a system operator core network 140 (hereinafter "core network 140"), a content server 110, a cache server 130, and a headend node 150. The data communication environment 100 also includes subscriber gateway devices 181, 183 and a number of client devices 191, 192, 193a, 193b, 194, 196.

In some implementations, the core network 140 includes a private and/or subscription-based network. The core network 140 includes any LAN and/or WAN, such as an intranet, an extranet, a virtual private network, and/or portions of the Internet. In some implementations, the core network 140 provides communication capability between any one of the client devices 191, 192, 193a, 193b, 194, 196 and one or more third party service providers and/or content providers (e.g., content server 110, cache server 130, etc.). In some implementations, the core network 140 provides communication capability between any one of the client devices 191, 192, 193a, 193b, 194, 196 and one or more private content servers, storage devices, gateways and/or service servers (not shown), as well as core network provided services and content. In some implementations, the core network 140 uses HyperText Transport Protocol (HTTP) to transport information using the Transmission Control Protocol/Internet Protocol (TCP/IP). HTTP permits client devices to access various resources available via the core network 140 and/or the public network 120. However, implementations are not limited to the use of any particular protocol. One having ordinary skill in the art should understand that other networks distributing multimedia (e.g., video, graphics, audio, and/or data, or otherwise referred to also herein individually or collectively as media content or simply, content) may also benefit from certain embodiments of adaptive streaming systems and methods, and hence, are contemplated to be within the scope of the disclosure. The term "resource" in this specification refers to information, devices, infrastructure, and services. A resource includes, for example, bandwidth, processor time, data storage, data structures, non-transitory memory, images, video streams, network transactions, and computational objects. In various implementations, the core network 140 includes a combination of computing devices, switches, routers, server systems, enterprise memory, and data connections.

As shown in FIG. 1, in some implementations, the core network 140 includes a gateway node 141 that provides an interface for data communication external to the core network 140 (e.g., to the public network 120, the content server 110, the cache server 130, etc.). In some implementations, the gateway node 141 is provided as a single entity (e.g., a server, a virtual machine, etc.). In some implementations, the gateway node 141 is implemented as a distributed system including a suitable combination of software, data structures, virtual machines, computing devices, servers, switches and routers. For the sake of brevity and convenience of explanation, the gateway node 141 is described herein as a single entity.

The core network 140 also includes a network administration node 142 or the like, which is arranged to monitor and/or manage one or more headend nodes. Similar to the gateway node 141, the network administration node 142 is illustrated as single entity (e.g., a server, virtual machine, etc.) in FIG. 1. In various implementations, however, the network administration node 142 is provided as a distributed system including a suitable combination of software, data structures, virtual machines, computing devices, servers, switches and routers. Merely for the sake of brevity and convenience of explanation, the network administration node 142 is described herein as a single entity.

In some implementations, the network administration node 142 includes at least one of an analytics module 143 and a resource management module 144. In some implementations, the analytics module 143 is provided to generate one or more shared-resource traffic quality indicator values, such as an aggregate QoE metric characterizing a distribution of QoE levels for each of the client devices sharing the one or more shared network resources. As described below, the resource management module 144 is configured to enable network-centric concerted management of respective levels of perceptual playback quality of media content data for a number of client devices sharing one or more network resources. The respective levels perceptual playback quality are managed by adjusting one or more shared network resources. Adjustments are at least based on an aggregate QoE metric. Accordingly, in some implementations, the resource management module 144 is configured to use one or more shared-resource traffic quality indicator values, such as an aggregate QoE metric, in order to provide network-centric concerted management of respective levels of perceptual playback quality for a number of client devices. The analytics module 143 and the resource management module 144 are not limited to implementation in or proximate to the network administration node 142. In various implementations, modules similar to one or both are included in headend nodes or other bottleneck points. For example, in some implementations, modules similar to one or both are included in one or more of a mobile network, a mobile packet core, a WiF access point, a cable modem and a residential gateway device.

The headend node 150 is coupled to the network administration node 142 and/or one or more other portions of the core network 140. In some implementations, the headend node 150 is capable of data communication using the public network 120 and/or other private networks (not shown). Those of ordinary skill in the art will appreciate that a headend node is typically configured to deliver cable TV, cable modem services and/or various other data services to subscriber client devices. To that end, a headend node includes a suitable combination of software, data structures, virtual machines, routers, switches and high-availability servers. For example, the headend node 150 includes a cable modem termination server (CMTS) 151 that is used to service an allocation of bandwidth shared by a number of client devices. The CMTS 151 includes a suitable combination of hardware, software and firmware for terminating one or more data channels associated with a number of client devices within the shared allocation of bandwidth. In some implementations, the headend node 150 includes at least one of an analytics module 153 and a resource management module (RMM) 154. As described below with reference to FIG. 2, the analytics module 153 is configured to generate one or more shared-resource traffic quality indicator values associated with the traffic on bandwidth available through and managed by the headend node 150. In some implementations, the resource management module 154 is configured to provide network-centric management of perceptual playback quality of media content data on each of a number of client devices sharing one or more network resources available through the headend node 150. Further, while the analytics module 153 and the resource management module 154 are shown as distinct modules, in some implementations, some or all of the functions of each are incorporated into a CMTS or the like.

Client devices access network resources, services and content offerings from a respective headend node through subscriber gateway devices. For example, as shown in FIG. 1, the subscriber gateway devices 181, 183 are coupled to the headend node 150, and thus share bandwidth (and/or other resources) available through the headend node 150. In various implementations, a subscriber gateway device includes, without limitation, devices such as cable modems (CM), wireless access points, and Ethernet modems.

Each subscriber gateway device 181, 183 is accessible by and services a number of client devices. For example, the client device 196 is coupled to the subscriber gateway device 183. Similarly, the subscriber gateway device 181 is coupled to and delivers services and/or content to a client device 191, a computing device 192, a smartphone 194, and an IP set-top box (STB) 193a (which in turn is coupled to TV 193b). As such, the bandwidth allocated to the subscriber gateway device 181 is shared by four devices in the example shown. The bandwidth allocated to the subscriber gateway device 181 is also a portion of the available bandwidth provided by the headend node 150. The headend node 150 also provides bandwidth allocations to the subscriber gateway device 183, which services client device 196. Thus, in this example, the total bandwidth available from the headend node 150 is ultimately shared by five client devices 191, 192, 193a/b, 194 and 196. Those of ordinary skill in the art will appreciate from the present disclosure that, in various implementations, a headend node can be connected to any number and combination of gateway nodes and client devices, and FIG. 1 is merely an example provided to discuss aspects of various implementations.

In some implementations, a subscriber gateway device is configured to manage access or assist in the management of network resources available through the subscriber gateway device to corresponding client devices. To that end, for example, the subscriber gateway device 181 includes an analytics module 181a and a resource management module 181b. In the example shown in FIG. 1, the analytics module 181a and the resource management module 181b are provided, individually or in combination, to manage access or assist in the management of network resources available to the client devices 191, 192, 193a/b, and 194. In some implementations, each of the analytics module 181a and the resource management module 181b include one or more respective functions of the corresponding the analytics modules 143, 152 and the resource management modules 144, 153 discussed above and below. Similarly, the subscriber gateway device 183 includes an analytics module 183a and a resource management module 183b.

With continued reference to FIG. 1, the content server 110 is configured to store and provide media content data. To that end, the content server 110 typically includes a non-transitory memory 111, a processor 115, an input-output (I/O) interface 116, and a network interface 117. The network interface 117 is configured to enable communication with other devices and systems, and for example, without limitation includes a modulator/demodulator (modem for communication with another device, system, or network), a radio frequency transceiver or another type of transceiver, a telephone interface, a bridge, a router, etc. In some implementations, the I/O interface 116 includes input devices, such as but not limited to, a keyboard, mouse, scanner, microphone, etc. The I/O interface 116 may also include output devices, such as but not limited to, a display, speakers, etc.

Figure 4:
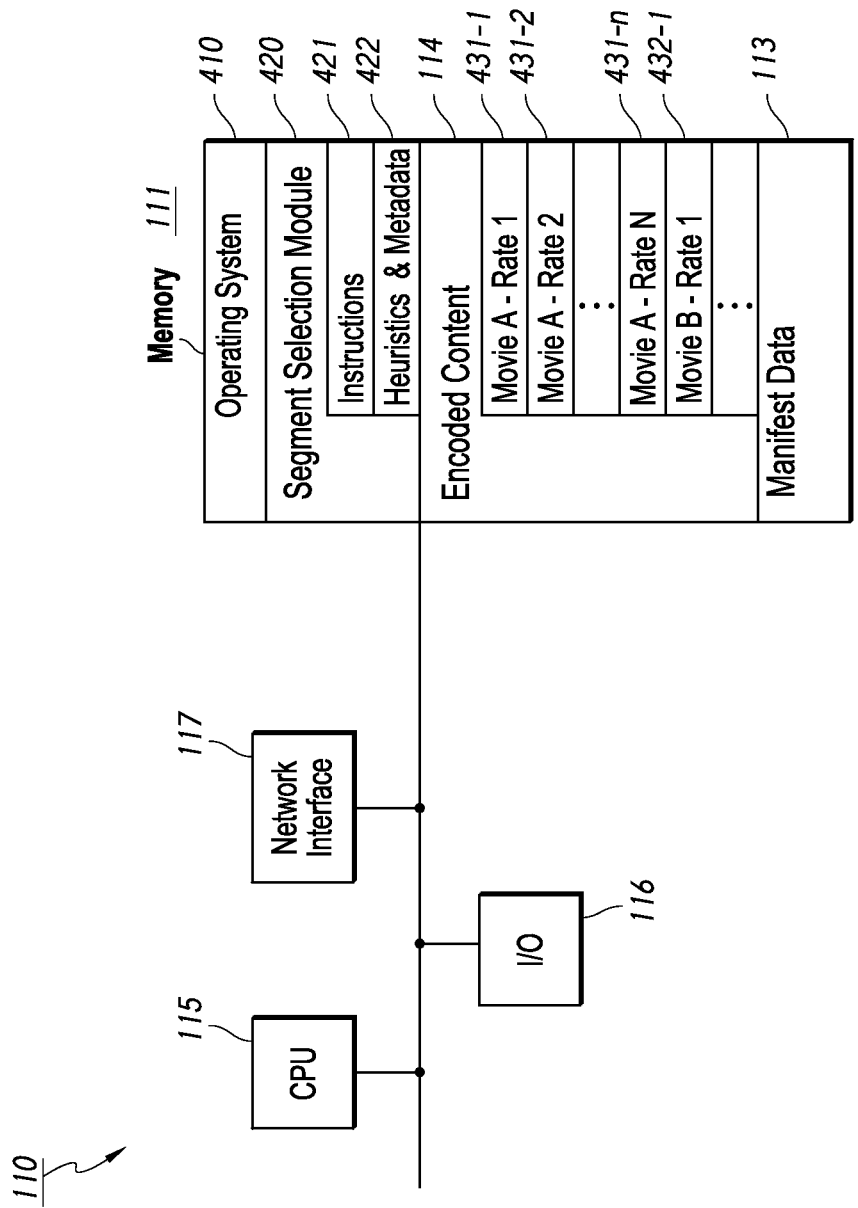
FIG. 4 is a block diagram of an example of a content server system in accordance with some implementations.

FIG. 4 is a block diagram of an example implementation of the content server system 110 of FIG. 1 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the content server system 110 includes one or more processing units (CPU's) 115, a network interface 117, a memory 111, and a local I/O interface 116. The memory 111 includes an operating system 410, which includes implementations of procedures for handling various basic system services and for performing hardware dependent tasks.

With reference to FIGS. 1 and 4, the memory 111 includes instructions 112 (421 in FIG. 4), a manifest 113 and encoded media content data 114. With reference to FIG. 1, in some implementations, the instructions 112 enable the selection of one or more encoding rate representations and/or one or more temporal segments of a media content data item in response to a request from a client device. With reference to FIG. 4, in some implementations the content server 110 also includes a segment selection module 420. The segment selection module 420 includes instructions 421 and heuristics and metadata 421. In some implementations, the instructions 421 in combination with the heuristics and metadata 421 enable the selection of one or more encoding rate representations and/or one or more temporal segments of a media content data item in response to a request from a client device. In some implementations, the encoded media content data 114 includes multiple representations of each of one or more media content data items. For example, as shown in FIG. 4, the encoded media content data 114 includes data representing two movies, namely Movie A and Movie B, as example media content data items. Those of ordinary skill in the art will appreciate that various other types of media content data include without limitation sports video, newscasts, music and concert videos, and various other types of TV programs, audio files and video games. The encoded content 114 includes multiple representations 431-1, 431-2, . . . , 431-n of Movie A, that are each encoded at a different bit rate than the other representations. Similarly, one of many representations of Movie B, indicated by 432-1, is also illustrated in furtherance of the example. In some implementations, a representation of a media content data item is divided into one or more temporal segments, each of which is available at one or more encoding rates. In some implementations, the manifest 113 includes metadata associated with each of the encoding rate representations and/or the temporal segments of the one or more media content data items. For example, the manifest 113 includes at least one of a respective encoding rate indicator, a quality level indicator, and a duration indicator for each representation of the one or more media content data items. In some implementations, a quality level indicator is explicitly indicated (e.g., as opposed to being inferred from the encoding bit rate), with the explicit indication corresponding to a perceptual playback quality metric such as mean square error (MSE), peak signal-to-noise ratio (PSNR), mean opinion score (MOS), relative degradation, or other well-known quality metrics. In some implementations, a quality level indicator includes a respective QoE metric associated with a temporal segment of a representation of a media content data item, characterized by a particular encoding rate.

The cache server 130 is configured to provide replicas of at least some of the media content data and associated metadata stored and provided by the content server 110. In various implementations, the cache server 130 is similarly configured to the content server 110, and includes, without limitation, a processor 135, a non-transitory memory 131, a network interface 137, and I/O interface 136. In some implementations, a request for media content data item from a client device is initially directed to or redirected to the cache server 130, when the cache server 130 is closer to the client device than the content server 100. The cache server 130 can also be used to supplement the content server 110 during times of excessive traffic.

Although FIG. 1 illustrates a number of discrete elements, FIG. 1 is intended to highlight various aspects of a network rather than to serve as a schematic strictly indicative of various network implementations. Thus, in various implementations, a network includes a subset or superset of the elements illustrated in FIG. 1. As such, a combination of elements could be implemented by a single element and some singular elements could be implemented by one or more elements. The number of elements and how various features and functions are allocated can vary between implementations, and may depend in part on the amount of traffic a network is configured to handle during various usage periods (e.g., peak, average, low, etc.).

In operation, various encoding rate representations of media content data items can be provided to client devices (e.g., client device 191) in a number of ways. For example, in ABR-enabled systems, a media content item (e.g., a particular movie, sportscast, etc.) is typically sub-divided into temporal segments (e.g., 2-10 seconds long) that are each encoded at respective bit rates. To that end, multiple representations of each segment are stored and made available by the content server 110 to client devices. The encoding bit rate of each segment representation in part characterizes the perceptual playback quality of the segment representation. Since each representation of a segment is encoded at a different bit rate, each representation has a different amount of data, and thus uses a different combination of bandwidth and/or time for transmission. Additionally, a variety of storage structures can be used for ABR media content data, such as directories with individual files for each segment, standardized file formats, and/or custom packaging schemes. In some implementations, the structure of the media content data, along with associated metadata associated with each segment, is contained in a separate structure, referred to above as a manifest (e.g., manifest data 113 in FIGS. 1 and 4). In some implementations, manifest data 113 also includes a respective quality level indicator that explicitly indicates the perceptual playback quality of each segment representation. More specifically, in some implementations, a quality level indicator provides a quantitative characterization of the perceptual playback quality of a segment representation for a client device that has the playback capability to achieve the indicated level of quality. As noted above, various quality level indicators include, without limitation, metrics such as mean square error (MSE), peak signal-to-noise ratio (PSNR), mean opinion score (MOS), relative degradation, or other well-known quality metrics.

An ABR-enabled client device selects and transmits a request (e.g., a HTTP GET command) for a specific segment representation from the content server 110. The selection decision is based on various parameters including the subscription tier bandwidth allocated to the client device and the amount of data currently residing in a playout buffer of the client device. As noted above, in accordance with previously known ABR client device methods, there is a general bias towards enabling a client device to consume as much bandwidth as is available to the client device. As a result, an ABR-enabled client device typically operates to select representations of segments with high encoding rates so that the client device consumes the bandwidth allocated to it based on an associated subscription tier. The typical ABR-enabled client device is also biased towards consuming bandwidth in excess of the allocation provided under the associated subscription tier when additional bandwidth becomes available.

Such previously known ABR methods are provided to increase utilization of bandwidth and/or other resources. A drawback of these methods is that they do not consider or determine whether actual perceptual quality of experience improvements, if any, achieved by an ABR-enabled client device justify the bias towards consuming available bandwidth. For example, a client device may select a 10 Mbps representation of a video stream segment over a 6 Mbps representation of the same video stream segment. However, depending on the content of the video stream segment (e.g., a movie scene with fast moving action versus a scene with mainly dialogue and little movement), the end user may not perceive an appreciable difference in playback quality. Without such an appreciable difference, the additional 4 Mbps bandwidth (or equivalently time) used to receive the 10 Mbps segment representation is misused, and could be utilized more productively. Additionally, a specified level of perceptual playback quality for a segment representation is often based on the playback capability of a client device. So for example, a first client device may only be capable of displaying video at a resolution of 720p, while a second client device is capable displaying video at a resolution of 1080p. If the first client device is not prevented from selecting the higher rate representation, as would be the cased with an ABR-enabled client device, the first client device would effectively misuse or misappropriate bandwidth from the second client device and/or other client devices by selecting the higher rate representation.

By contrast, as provided by some implementations, a more effective use of available bandwidth includes limiting the first client device to a segment representation with a resolution of 720p as opposed to 1080p, because the difference in playback quality cannot be realized on the first client device in the example. More generally, various implementations provide for concerted management of respective levels of perceptual playback quality for a number of client devices by regulating a shared network resource using an aggregate QoE metric. For example, some implementations include a method of improving aggregated perceptual playback quality metrics for a number of client devices sharing a network resource. In another example, some implementations include substantially equalizing average perceptual playback quality for a number of client devices sharing a network resource. In yet another example, some implementations include improving a set of perceptual quality metric floors for a number of client devices on a shared data link with a defined bandwidth.

For example, first and second client devices are allocated respective bandwidth allocations over a shared link by a resource management module (e.g., resource management module 153). The first and second client devices are configured to operate within the respective bandwidth allocations, and are configured to request content streams at bit rates such that each stream does not exceed the respective bandwidth allocation. The first and second client devices are each initially assigned respective bandwidth allocations of 4 Mbps on a shared link having a total of 8 Mbps bandwidth. In furtherance of this example, the first client device is operating to receive a sports video stream (i.e., characterized by rapid pixel changes), and the second client device is operating to receive a newscast video stream (i.e., characterized by slow pixel changes). The sports video stream may be available at three bit rates, 8 Mbps stream with good quality video, 6 Mbps with acceptable quality video, and 4 Mbps stream with poor quality video. The newscast video stream may also be available in four bit rates, 8 Mbps stream with excellent quality video, 6 Mbps stream with excellent video quality (the 8 Mbps stream being insubstantially better than 6 Mbps stream in terms of quality), 4 Mbps stream with good quality video, and 2 Mbps with acceptable quality video. In accordance with some implementations, bandwidth is reallocated between the first and second devices so that the perceptual playback quality metrics for both the first and second client devices are equalized in order to improve the aggregate QoE for both devices. In accordance with some implementations, bandwidth is reallocated between the first and second devices so that the perceptual playback quality metrics for both the first and second client devices do not breach a floor value of quality (e.g., not less that "acceptable" video quality).

Figure 2:
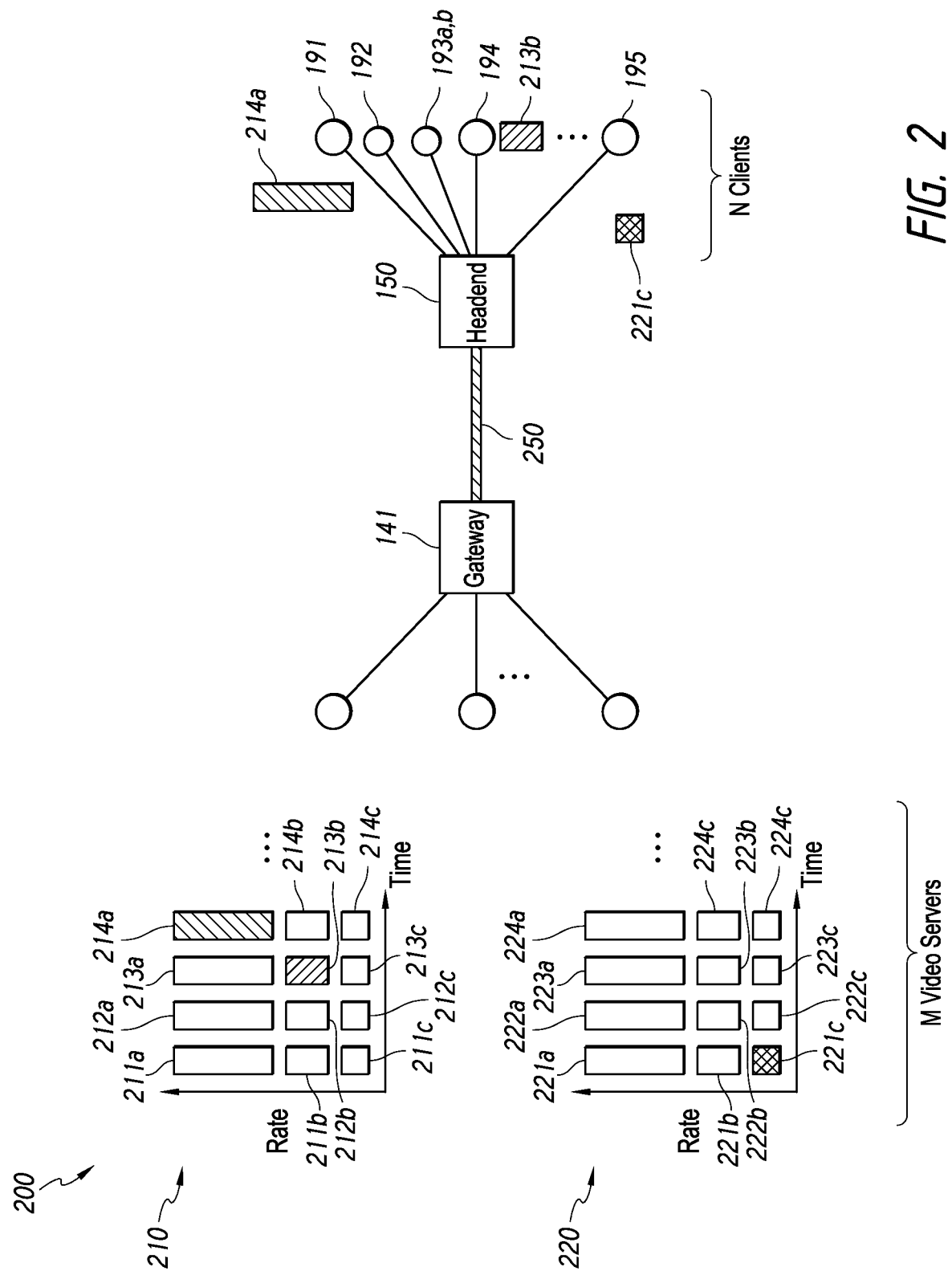
FIG. 2 is a block diagram of a data link congestion model in accordance with some implementations.

FIG. 2 is a block diagram of a data link congestion model 200 that illustrates the issues described above. The data link congestion model 200 shown in FIG. 2 is similar to an adapted from the data communication environment 100 provided in FIG. 1. Elements common to FIGS. 1 and 2 include common reference numbers, and only the differences between FIGS. 1 and 2 are described herein for the sake of brevity. To that end, the congestion model 200 includes a link 250 providing a shared allocation of bandwidth between the gateway node 141 and headend node 150. The headend node 150 is ultimately coupled to the five client devices 191, 192, 193a/b, 194 and 195. Thus, in this example and in FIG. 1, the total bandwidth available through the headend node 150 on link 250 is ultimately shared by the five client devices 191, 192, 193a/b, 194 and 195.

The congestion model 200 in FIG. 2 also includes first and second media content data items 210, 220 stored at M video servers (not shown). The first media content data item 210 includes a first set of segment representations 211a,b,c, a second set of segment representations 212a,b,c, a third set of segment representations 213a,b,c, and a fourth set of segment representations 214a,b,c. The first set of segment representations 211a,b,c includes segment representations for a first temporal segment of the first media content data item 210. Similarly, the second, third and fourth sets of segment representations (212a,b,c, 213a,b,c, 214a,b,c) are for respective second, third and fourth temporal segments of the first media content data item 210. The second media content data item 220 includes a first set of segment representations 221a,b,c, a second set of segment representations 222a,b,c, a third set of segment representations 223a,b,c, and a fourth set of segment representations 224a,b,c. The first, second, third and fourth sets of segment representations (221a,b,c, 222a,b,c, 223a,b,c, 224a,b,c) are for respective first, second, third and fourth temporal segments of the second media content data item 220.

In operation, the five client devices 191, 192, 193a/b, 194 and 195 are each able to select segment representations. In some implementations, a client device selects a temporal segment based on a respective portion of the bandwidth on link 250 allocated to the client device. For example, as shown in FIG. 2, the client device 191 selects segment representation 214a, corresponding to the highest encoding rate available for the fourth temporal segment of the first media content data item 210. The client device 194 selects segment representation 213b, corresponding to the middle encoding rate available for the third temporal segment of the first media content data item 210. And, the client device 195 selects segment representation 221c, corresponding to the middle encoding rate available for the third temporal segment of the second media content data item 220. Additionally, in ABR-enabled implementations, a client device is able to exceed the bandwidth allocated to it when other portions of the bandwidth on link 250 are underutilized, and thus select segment representations with higher encoding rates that are normally supported by the bandwidth nominally allocation to the client device.

Client devices generally include any suitable computing device, such as a computer, a laptop computer, a tablet device, a netbook, an internet kiosk, a personal digital assistant, a mobile phone, a smartphone, a gaming device, a computer server, etc. In some implementations, each client device includes one or more processors, one or more types of memory, a display and/or other user interface components such as a keyboard, a touch screen display, a mouse, a track-pad, a digital camera and/or any number of supplemental devices to add functionality. As an example, FIG. 3, a block diagram of a configuration of a client device 300 in accordance with some implementations. While pertinent features are illustrated, those of ordinary skill in the art will appreciate from the present disclosure that various other features have not been illustrated for the sake of brevity and so as not to obscure more pertinent aspects of the example implementations disclosed herein.

In some implementations, the client device includes a suitable combination of hardware, software and firmware configured to provide at least some of protocol processing, modulation, demodulation, data buffering, power control, routing, switching, clock recovery, amplification, decoding, and error control. In some implementations, at least a portion of the control module and at least a portion of the plurality of optical communication devices are provided on a first substrate. For example, the client device 300 includes a communication interface 302. In some implementations, the communication interface 302 is suitable for communication over, among others, an IP network, a coaxial cable network, an HFC network, and/or wireless network. The communication interface 302 is coupled to a demultiplexer (demux) 304. The demux 304 is configured to parse the metadata (e.g., in the packet header or in the manifest) of segment representations and the body or payload data of the same. Metadata includes, for example, timestamp information, packet identifiers, program numbers, quality level, and/or other information useful for decoding and utilizing a received segment representation. The segment data and metadata information is provided to a media engine 306 as explained further below.

Although client device 300 is described in the context of various internet video streaming implementations, such as IPTV and VoD, the client device 300 may comprise additional and/or different components in various other implementations. For instance, in some implementations, the client device 300 includes a tuner system (e.g., radio frequency tuning, not shown) coupled to communication interface 302. In some implementations, a tuner system includes one or more tuners for receiving transport streams received via communication interface 302. Additionally and/or alternatively, in some implementations, a demodulator is employed to demodulate the received carrier signal and the demux 304 is configured to parse the transport stream packets of one or more defined carrier frequencies.

Figure 3:
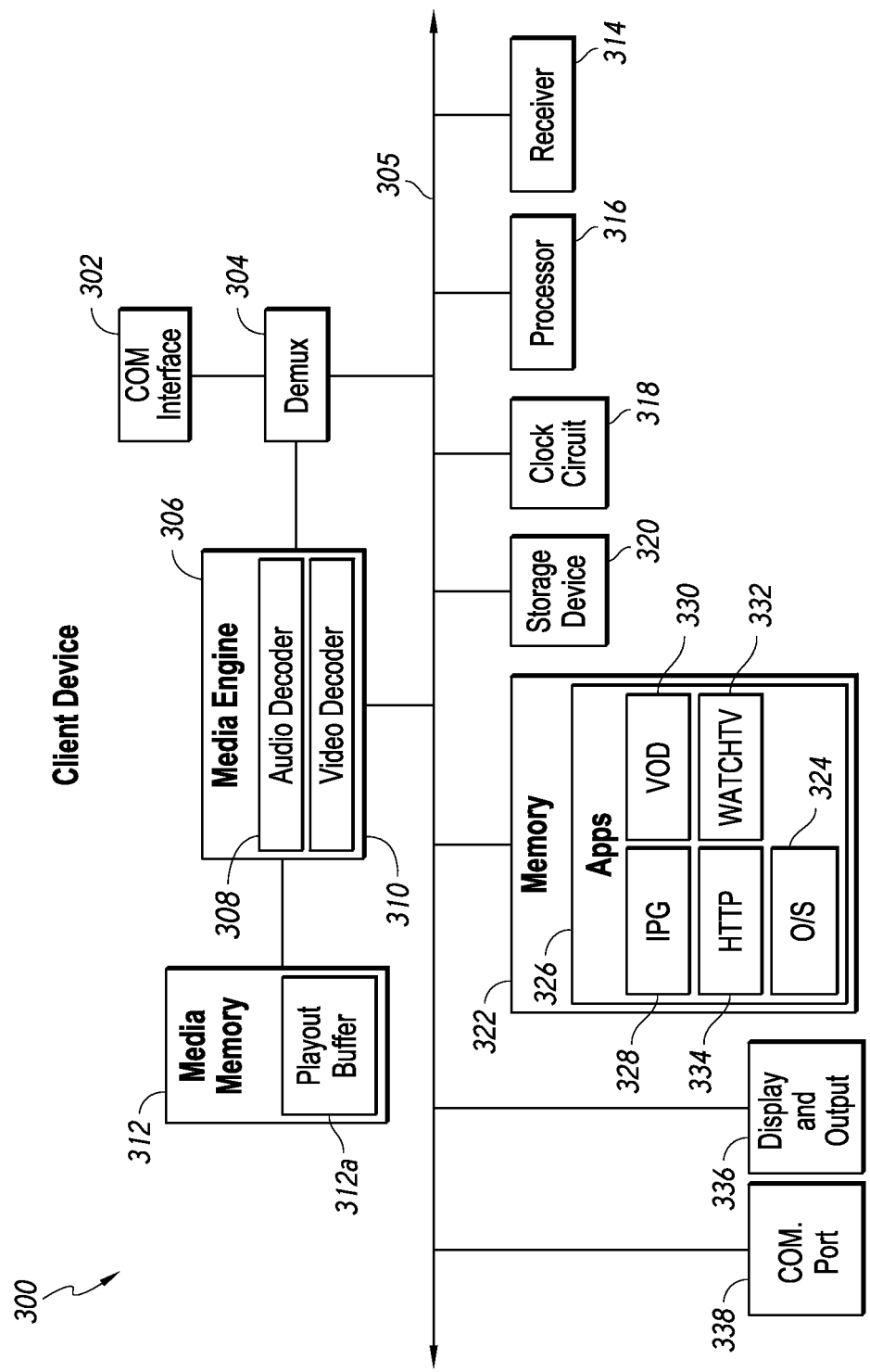
FIG. 3 is a block diagram of an example of a client device in accordance with some implementations.

As shown in FIG. 3, the demux 304 is coupled to a bus 305 and to media engine 306 (i.e. an audio/video (A/V) processing or decoding device). The media engine 306 includes decoding logic including, for example, at least one of an audio decoder 308 and a video decoder 310. The media engine 306 also includes buffer management functionality to facilitate a determination as to current buffer level within the client device 300. The media engine 306 is further coupled to bus 305 and to a media memory 312. The media memory 312 includes one or more buffers (e.g. playout buffers) for temporarily storing compressed and/or reconstructed pictures and/or audio frames. In some implementations, the buffers of media memory 312 and/or other buffers (e.g., network buffers) reside in other memory devices, or distributed among media memory 312 and memory 322.

In some implementations, the client device 300 includes additional components coupled to bus 305. For example, the client device 300 also includes a receiver 314 configured to receive user input. In some implementations, the client device 300 includes a processor 316 for executing and managing operations of the client device 300. In some implementations, the client device 300 includes a clock circuit 318 comprising phase and/or frequency locked-loop circuitry (or software, or combination of hardware and software) configured to synchronize clock information received in an audio, video, or A/V stream to facilitate decoding operations and to clock the output of reconstructed audiovisual content.

In some implementations, the client device 300 also includes a storage device 320 (and associated control logic) provided to temporarily store buffered content and/or to more permanently store recorded content. The memory 322 includes at least one of volatile and/or non-volatile memory, and is configured to store executable instructions or computer code associated with an operating system (O/S) 324, one or more applications 326 (e.g., an interactive programming guide (IPG) 328, a video-on-demand (VoD) app 330, a WatchTV app 332 (associated with broadcast network TV), HTTP logic 334, among other applications such as pay-per-view, music, personal video recording (PVR), driver software, etc. In some implementations, profile selection logic includes HTTP client functionality, and may generate requests for segment representation from a content server (e.g., content server 110).

The client device 300 may be further configured with display and output logic 336, as indicated above that may include graphics and video processing pipelines, among other circuitry to process the decoded pictures and associated audio and provide for presentation (e.g., display) on, or associated with, a display device or other media device. A communications port 338 (or ports) may further be included in the client device 300 for receiving information from and transmitting information to other devices. For instance, communication port 338 may feature USB (Universal Serial Bus), Ethernet, IEEE-1394, serial, and/or parallel ports, etc. In addition, communications port 338 may be configured for home networks (e.g., HPNA/MoCA, etc.). The client device 300 may also include an analog video input port for receiving analog video signals.

Figure 5:
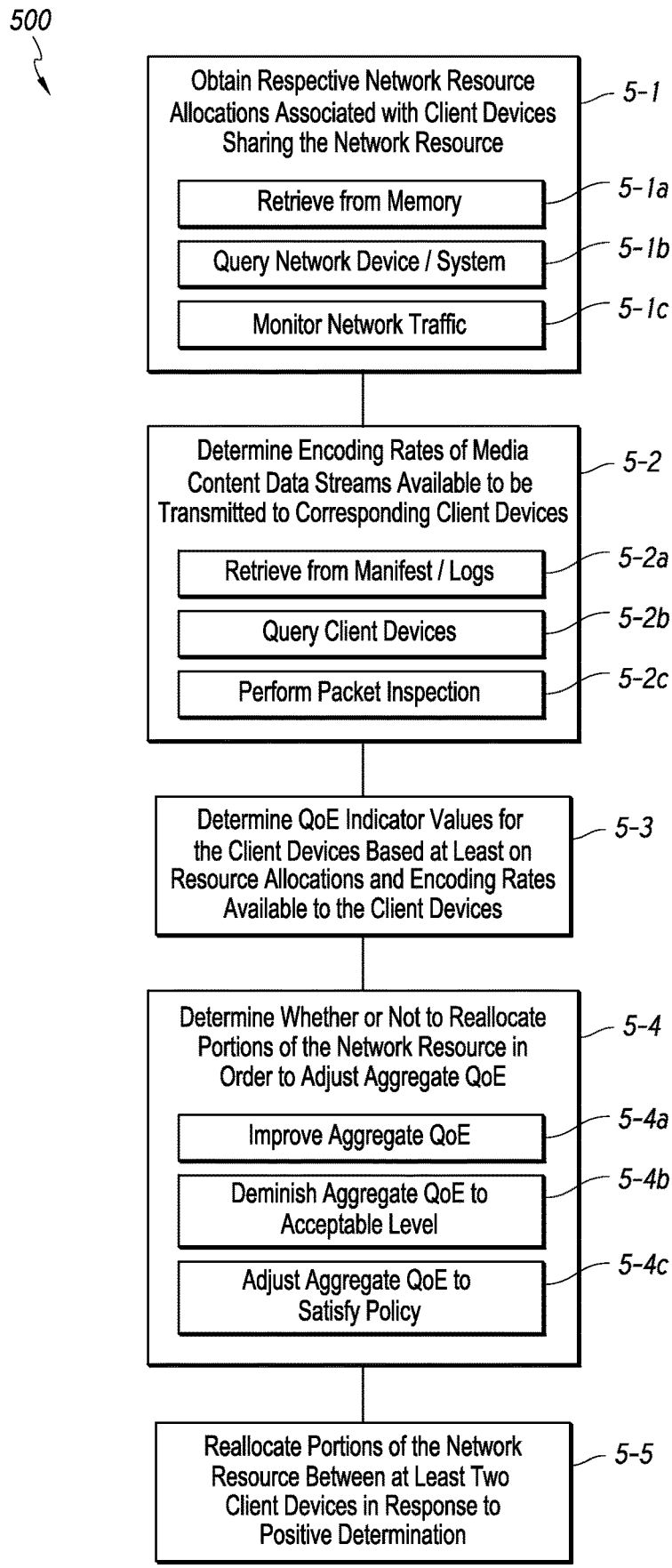
FIG. 5 is a flowchart representation of a method of allocating a network resource using perceptual playback quality indicators according to some implementations.

FIG. 5 is a flowchart representation of a method 500 of allocating a network resource using perceptual playback quality indicators according to some implementations. In some implementations, the method 500 is performed by a resource management module associated with a network administration node (e.g., network administration node 142) and/or a resource bottleneck node (e.g., headend node 150, gateway 181, etc.). Briefly, the method 500 includes determining a number of QoE indicator values for the client devices sharing a network resource, and reallocating portions of the network resource between at least two of the client devices in order to manage an aggregate QoE metric. In some implementations, one or more shared-resource traffic quality indicators characterize the capacity of a network to deliver data-intensive traffic at various perceptual quality levels to a number of client devices.

To that end, as represented by block 5-1, the method 500 includes obtaining respective network resource allocations associated with a number of client devices sharing a network resource (e.g., bandwidth, processor time, memory, etc.). For example, with reference to FIG. 1, in operation at least one of the resource management modules 144, 153, 181b obtains the respective bandwidth allocations provided to the client devices 191, 192, 193a/b, 194. In some implementations, as represented by block 5-1a, obtaining the respective network resource allocations includes retrieving at least some of the respective network resource allocations from non-transitory memory. In some implementations, as represented by block 5-1b, obtaining the respective network resource allocations includes querying and receiving at least some of the respective network resource allocations from one of a network device, an administration module and/or system. In some implementations, as represented by block 5-1c, obtaining the respective network resource allocations includes monitoring network traffic in order to determine at least some of the respective network resource allocations. For example, with reference to FIG. 1, one of the analytics module 152 and resource management module 153 included in the headend 150 is configured to monitor traffic to and/or from client devices and determine respective resource utilization values that are each representative of how much of a network resource is being utilized by a particular client device.

As represented by block 5-2, the method 500 includes determining encoding rates of media content data streams available to be transmitted to corresponding client devices. For example, with reference to FIG. 1, in operation at least one of the resource management modules 144, 153, 181b determines the encoding rates for various segment representations of various media content data items. In some implementations, as represented by block 5-2a, determining the encoding rates includes retrieving at least some of the encoding rates from a manifest and/or logs stored in a non-transitory memory (e.g., from content server 110). In some implementations, as represented by block 5-2b, determining the encoding rates includes querying and receiving at least some of the encoding rates from one or more client devices making the segment representation selections. For example, with reference to FIG. 1, in operation one of the analytics module 181a and resource management module 181b included in the subscriber gateway device 181 communicates with the client devices 191, 192, 193a/b, 194 in order to determine the encoding rates. In some implementations, as represented by block 5-2c, determining the encoding rates includes performing deep packet inspection of data packets sent to and/or from the client devices in order to determine the encoding rate of segment representations selected by the client devices. For example, with reference to FIG. 1, in operation one of the analytics module 181a and resource management module 181b included in the subscriber gateway device 181 performs deep packet inspection on packets addressed to and/or transmitted from the client devices 191, 192, 193a/b, 194.

As represented by block 5-3, the method 500 includes determining QoE indicator values for the client devices based at least on resource allocations, encoding rates for segment representations available to client devices, and preference level values associated with client devices. For example, with reference to FIG. 1, in operation at least one of the analytics modules 143, 152, 181a determines the QoE indicator values. In some implementations, the QoE indicators values are retrieved from a content server including a manifest (e.g., content server 110). In some implementations, the manifest includes respective levels of perceptual playback quality of a number of segment representations of media content data items. In some implementations, the QoE indicators values are retrieved from the client devices, and include at least one of a playback preference level, playback capability, degradation tolerance, one or more degradation policies, buffer level metric, and a bandwidth utilization metric associated with one or more of the client devices.

As represented by block 5-4, the method 500 includes determining whether or not to reallocate portions of the network resource between at least two client devices in order to adjust an aggregate QoE metric. For example, with reference to FIG. 1, in operation at least one of the resource management modules 144, 153, 181b determines whether or not to reallocate portions of the network resource between at least two client devices in order to adjust an aggregate QoE metric. As represented by block 5-4a, in some implementations, determining whether or not to reallocate includes assessing whether or not reallocation will improve the aggregate QoE metric. For example, bandwidth is reallocated between first and second client devices when the combination of the resulting QoE metrics associated with the first and second client devices improves as a result of a reallocation. As represented by block 5-4b, in some implementations, determining whether or not to reallocate includes assessing whether or not an aggregate QoE metric associated with a number of client devices will diminish within an acceptable level as a result of reallocation. For example, bandwidth allocations for a respective number of client devices are each reduced when the corresponding aggregate QoE metric is degraded by an acceptable amount. In some implementations, such a reallocation is used in order to make a portion of the shared network resource available to an additional or a new client device. As represented by block 5-4c, determining whether or not to reallocate includes assessing whether or not a reallocation will substantially satisfy a network operator policy and/or a subscriber policy. For example, a network operator may have a policy that specifies the maximum and/or minimum perceptual playback quality that a client device associated with a subscription tier is permitted. Thus, in some implementations, bandwidth reallocations are subject to satisfying one or more network operator policies. As represented by block 5-5, the method 500 includes reallocating portions of the network resource between at least two client devices in response to an affirmative determination to reallocate.

Figure 6:
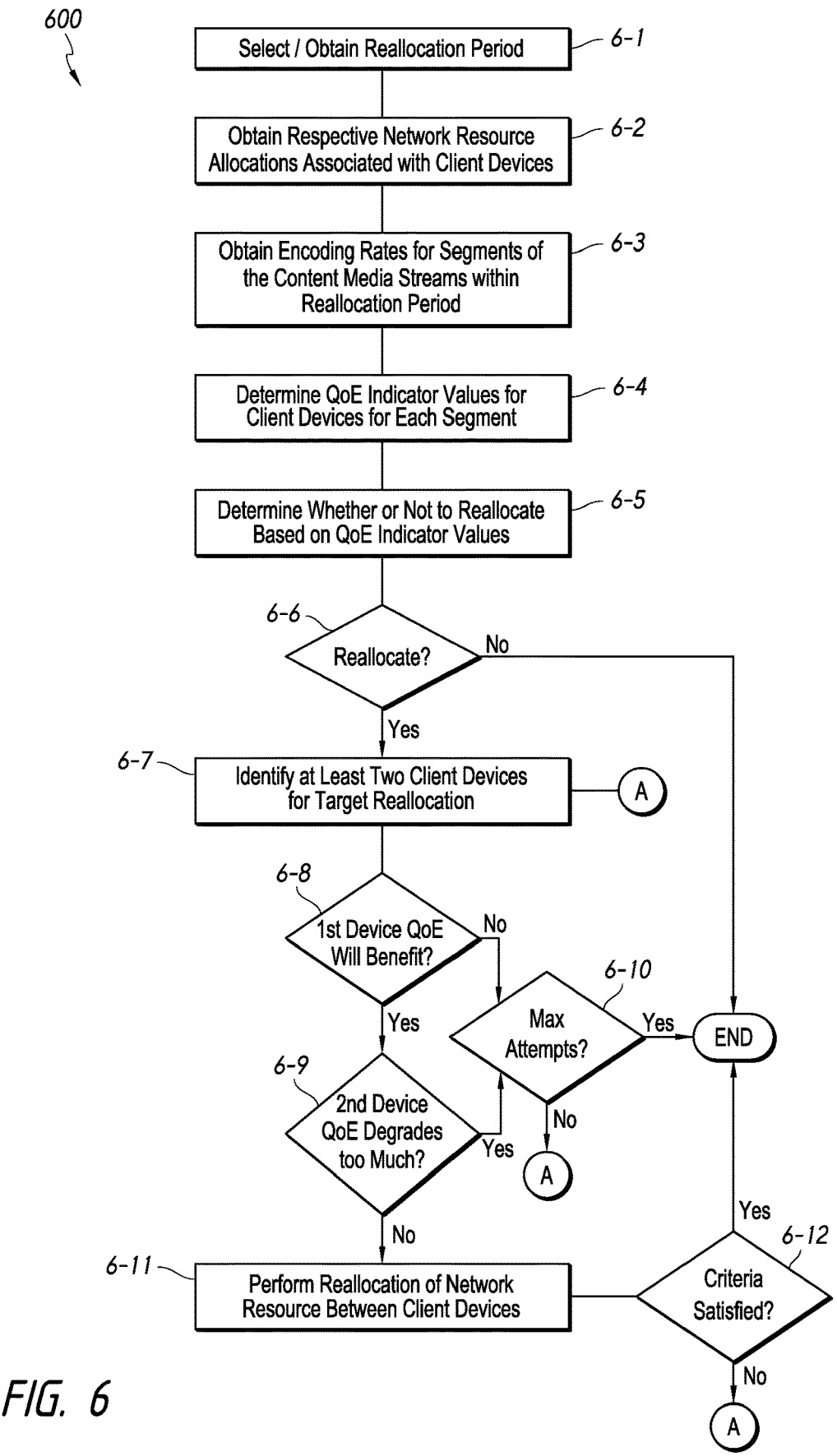
FIG. 6 is a flowchart representation of a method of allocating a network resource using perceptual quality indicators according to some implementations.

FIG. 6 is a flowchart representation of a method 600 of allocating a network resource using perceptual quality indicators according to some implementations. In some implementations, the method 600 is performed by a resource management module associated with a network administration node (e.g., network administration node 142) and/or a resource bottleneck node (e.g., headend node 150, gateway 181, etc.). Briefly, the method 600 includes determining QoE indicator values associated with client devices sharing a network resource, and reallocating portions of the network resource in order to manage an aggregate QoE metric. The aggregate QoE metric characterizes a distribution of client device QoE levels, and thus provides a representation of the perceptual playback quality enabled by the network. In some implementations, the aggregate QoE metric also characterizes the capacity of a network to deliver data-intensive traffic at various perceptual quality levels to a number of client devices.

To that end, as represented by block 6-1, the method 600 includes selecting or obtaining a reallocation period during which respective resource allocations for corresponding client devices are evaluated based on associated QoE levels. As represented by block 6-2, the method 600 includes obtaining respective network resource allocations for corresponding client devices sharing a network resource (e.g., bandwidth, processor time, memory, etc.). For example, with reference to FIG. 1, in operation at least one of the resource management modules 144, 153, 181b obtains the respective bandwidth allocations provided to client devices 191, 192, 193a/b, 194. As represented by block 6-3, the method 600 includes determining encoding rates of media content data streams available from the content server. For example, with reference to FIG. 1, in operation at least one of the resource management modules 144, 153, 181b obtains the encoding rates for various segment representations of various media content data items. As represented by block 6-4, the method 600 includes determining QoE indicator values for the client devices based at least on resource allocations and encoding rates for segment representations available to client devices. For example, with reference to FIG. 1, in operation at least one of the analytics modules 143, 152, 181a determines QoE indicator values. As represented by block 6-5, the method 600 includes determining whether or not to reallocate portions of the network resource between at least two client devices based on the QoE indicator values. For example, in some implementations, determining whether or not to reallocate includes determining at least one of whether reallocation will adjust one or more of the QoE indicator values towards and/or away from satisfying a performance criterion and/or a network policy, and whether reallocation will adjust an aggregate QoE metric, associated with at least some of the client devices, towards or away from satisfying a performance criterion and/or a network policy.

As represented by block 6-6, the method 600 includes determining whether an affirmative determination for reallocation has been generated. If an affirmative determination was not generated ("No" path from block 6-6), the method 600 ends for the current reallocation period. On the other hand, if an affirmative determination was generated ("Yes" path from block 6-6), as represented by block 6-7, the method 600 includes identifying at least two client devices as candidates for network resource reallocation. As represented by block 6-8, the method 600 includes determining whether or not a respective QoE metric for a first one of the identified devices will benefit from reallocation. For example, the method includes determining whether or not increased bandwidth will enable a first client device to select a segment representation that provides in a substantial and realizable improvement in perceptual playback quality using the first client device. If a respective QoE metric for a first one of the client devices will not improve in an appreciable manner ("No" path from block 6-8), the method 600 proceeds to the portion of the method represented by block 6-10, which is described below. On the other hand, if a respective QoE metric will improve ("Yes" path from block 6-8), as represented by block 6-9, the method 600 includes determining whether a respective QoE metric for a second device will degrade too severely in response to the reallocation. If the respective QoE metric for a second one of the devices will not degrade too severely in response to the reallocation ("No" path from block 6-9), as represented by block 6-11, the method 600 includes performing a reallocation of the network resource between the first and second devices.

As represented by block 6-12, the method 600 includes determining whether or not a performance criterion has been satisfied in response to the reallocation. For example, in some implementations, determining whether or not a performance criterion has been satisfied includes determining at least one of: whether or not the reallocation sufficiently adjusted one or more of the QoE indicator values towards satisfying a performance criterion and/or a network policy; and, whether or not a reallocation sufficiently adjusted an aggregate QoE metric, associated with at least some of the client devices, towards satisfying a performance criterion and/or a network policy. If the performance criterion has been satisfied ("Yes" path from block 6-12), the method 600 ends for the reallocation period. On the other hand, if the performance criterion has not been satisfied ("No" path from block 6-12), the method 600 circles back to the portion of the method represented by block 6-7. Additionally and/or alternatively, in some implementations, the method proceeds to the portion of the method represented by block 6-10.

Referring again to block 6-9, if reallocation will cause the respective QoE metric for a second client device to degrade too severely ("Yes" path from block 6-9), as represented by block 6-10, the method 600 includes determining whether or not a maximum number of reallocation attempts has been carried out for the current reallocation period. If the maximum number of attempts has been carried out ("Yes" path from block 6-12), the method 600 ends for the remainder of the current reallocation period. On the other hand, if the maximum number of attempts has not been carried out ("No" path from block 6-12), the method 600 circles back to the portion of the method represented by block 6-7.

Figure 7A:
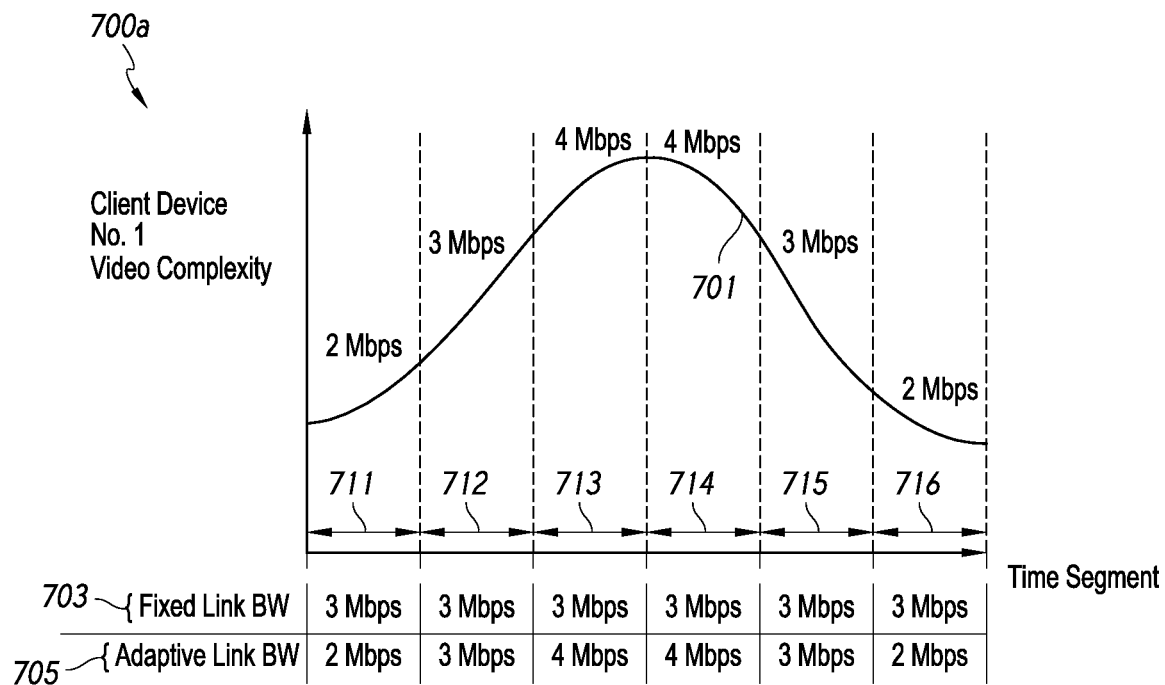
FIGS. 7A and 7B are performance diagrams showing reallocation of a shared bandwidth using perceptual playback quality indicators according to some implementations.
Figure 7B:
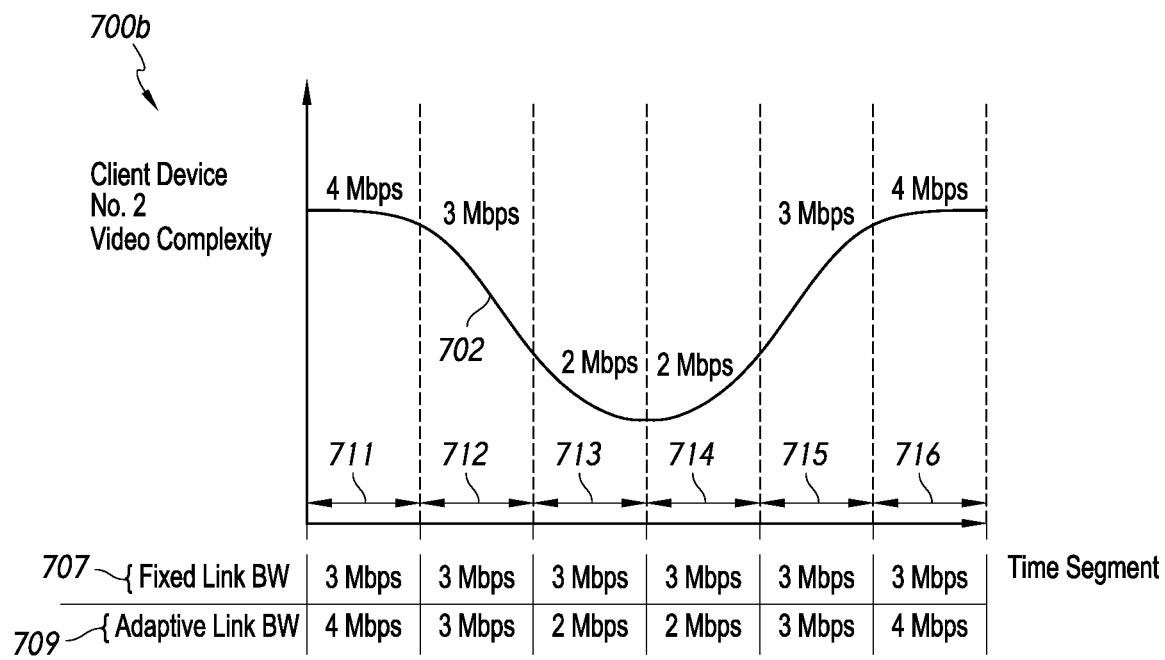

FIGS. 7A and 7B are performance diagrams 700a, 700b showing an example of reallocating portions of 6 Mbps of total bandwidth between first and second client devices. While FIGS. 7A and 7B are illustrated and described herein with respect to two client devices and 6 Mbps of total bandwidth as an example, those of ordinary skill in the art will appreciate that various implementations include two or more client devices that share various available allocations of a network resource (e.g., bandwidth, CPU time, memory, etc.).

In accordance with previously known network management practices, FIG. 7A shows that, as an example, the first client device is provided a fixed bandwidth allocation 703 of 3 Mbps over all of the temporal segments 711, 712, 713, 714, 715, 716. Similarly, FIG. 7B shows that, as an example, the second client device is provided a fixed bandwidth allocation 707 of 3 Mbps over all of the temporal segments 711, 712, 713, 714, 715, 716, in accordance with previously known network management practices. More generally, in accordance with previously known network management practices, two client devices sharing a portion of bandwidth would each receive a fixed portion of the bandwidth that is statically assigned based on a subscription tier model.

By contrast, in accordance with various implementations, FIG. 7A also provides an illustration of an adaptive bandwidth allocation 705 and its use 701 for the first client device over the temporal segments 711, 712, 713, 714, 715, 716. Similarly, FIG. 7B also provides an illustration of an adaptive bandwidth allocation 709 and its use 702 for the second client device over the temporal segments 711, 712, 713, 714, 715, 716. In some implementations, each of the temporal segments 711, 712, 713, 714, 715, 716 serves as a reallocation assessment period, during which the adaptive bandwidths allocations 705, 709 are evaluated as described above with respect to FIGS. 5 and 6. In some implementations, at the end of each reallocation assessment period, the respective adaptive bandwidth allocations 705, 709 for the first and second client devices are adjusted so that an aggregate QoE metric is adjusted towards satisfying a performance criterion.

Additionally and/or alternatively, in some implementations, the respective adaptive bandwidth allocations 705, 709, for at least some of the temporal segments, are assigned based on a priori knowledge of the respective media content data items associated with the first and second client devices. In some implementations, the respective adaptive bandwidth allocations 705, 709 are provided to enable the first and second client devices to select encoding rate segment representations of video content that satisfy a corresponding QoE metric for each of the first and second client devices and/or an aggregate QoE metric for the combination of the first and second client devices. Accordingly, bandwidth is reallocated between the first and second devices so that the QoE realized on both is improved based on the characteristics of the segment representations that are being consumed. For example, during the first temporal segment 711, the first client device is allocated 2 Mbps of bandwidth and the second client device is allocated 4 Mbps of bandwidth if the segment representations available to each at these respective allocations satisfies an aggregate QoE metric. During the second temporal segment 712, the respective allocations are adjusted to 3 Mbps each. During the third temporal segment 713, the respective allocations are adjusted so that the first client device is allocated 4 Mbps and the second client device is allocated 2 Mbps. During the fourth temporal segment 714, the respective allocations are not adjusted with respect to the third temporal segment 713 in order to satisfy the aggregate QoE metric. However, during the fifth temporal segment 715, the second client device demands more bandwidth if the aggregate QoE metric is to remain at an appropriate level. As such, during the fifth temporal segment 715, the respective allocations are adjusted so that the first client device is allocated 3 Mbps and the second client device is allocated 3 Mbps. And, during the sixth temporal segment 716, the respective allocations are adjusted so that the first client device is allocated 2 Mbps and the second client device is allocated 4 Mbps. Over the six temporal segments 711, 712, 713, 714, 715, 716 illustrated, the first and second client devices each operate to individually select respective segment representations, indicated by 701 and 702, which satisfy a corresponding client device QoE performance criterion within their respective bandwidth allocation 705, 709 provided by the network. In other words, in some implementations, ABR-enabled client devices and the like are prevented from detecting and consuming underutilized bandwidth because a network control module (e.g., a resource management module) fully allocates bandwidth between the subscribing client devices.

In some implementations, network operators configure network infrastructure so that multiple independent services are able to simultaneously share network resources (e.g., bandwidth, processor time, memory, etc.). For example, network infrastructure can be used to separately provide cable TV service, Internet service and telephone service to each of one or more client devices and/or subscriber gateways. Using previously known infrastructure management practices, network operators statically provision network resources for different services, so that each service can be operated and managed independently of the others. In turn, a particular client device and/or subscriber gateway receives a respective static allocation of the network resource(s) for each service. For example, network operators typically statically allocate bandwidth on a communication link and/or a group of communication links, so that a subscriber of both cable TV and Internet services receives a respective fixed allocation of bandwidth for each service. However, depending on the traffic associated with each service at a given time, the resource allocation for one of the services may be underutilized by the subscriber, while the resource allocation for another one of the services is strained or highly utilized by the subscriber.

Figure 8:
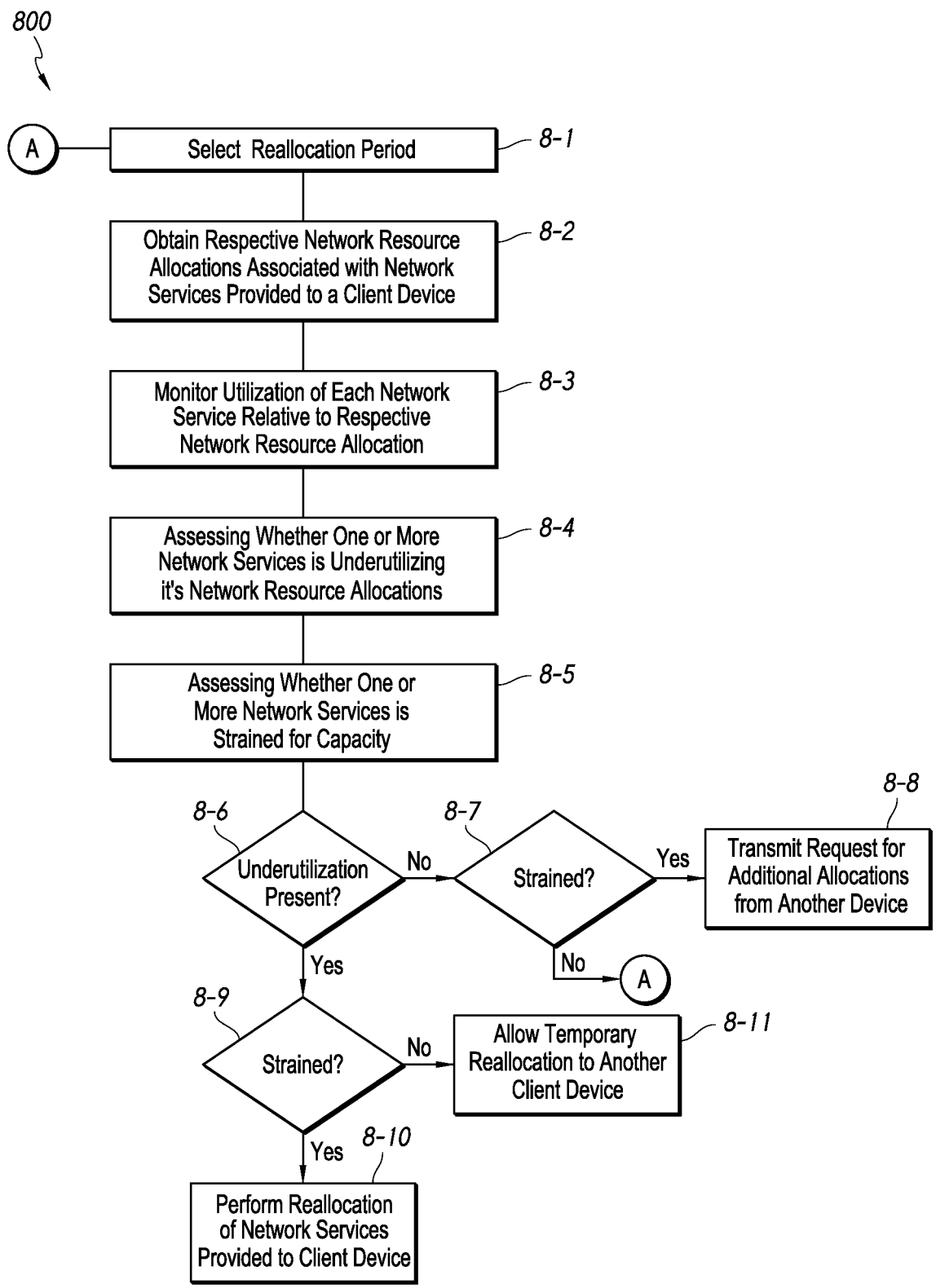
FIG. 8 is a flowchart representation of a method of reallocating a network resource between services in accordance with some implementations.

Various implementations provide systems, methods and devices that enable adaptive reallocation of network resources between multiple services (e.g., cable TV service, Internet service, telephone service, etc.) provided to a particular client device and/or subscriber gateway. To that end, FIG. 8 is a flowchart representation of a method 800 of reallocating a network resource between services for a particular subscriber gateway and/or client device in accordance with some implementations. In some implementations, the method 800 is performed by a resource management module (e.g., network administration node 142) and/or a resource bottleneck node (e.g., headend node 150, gateway 181, etc.). Briefly, the method 800 includes determining respective utilization indicator values associated with corresponding services sharing a network resource, and reallocating portions of the network resource in order to manage utilization of the network resource between the services.

To that end, as represented by block 8-1, the method 800 includes selecting or obtaining a reallocation period during which resource allocations for services are evaluated according to relative utilizations. As represented by block 8-2, the method 800 includes obtaining respective network resource allocations for corresponding services sharing a network resource (e.g., bandwidth, processor time, memory, etc.). As represented by block 8-3, the method 800 includes monitoring utilization of the respective resource allocation for each service. As represented by block 8-4, the method 800 includes assessing whether one of the network services is underutilizing its respective resource allocation. As represented by block 8-5, the method 800 includes assessing whether one of the network services is strained for capacity given the respective resource allocation.

As represented by block 8-6, the method 800 includes determining whether or not one of the respective resource allocations is underutilized by the corresponding service based on the above assessment. If none of the resource allocations are underutilized ("No" path from block 8-6), as represented by block 8-7, the method 800 includes determining whether or not one of the services is strained for capacity based on the above assessment. If none of the services are strained for capacity ("No" path from block 8-7), the method 800 circles back to the portion of the method represented by block 8-1. On the other hand, if at least one of the services is strained for capacity ("Yes" path from block 8-7), as represented by block 8-8, the method 800 includes transmitting a request for an additional resource allocation from another device. In other words, the method includes requesting that a portion of one or more network resources is reallocated to the device and/or subscriber gateway that is strained for capacity.

Referring again to block 8-6, if a resource allocation for a service is currently underutilized by the subscriber ("No" path from block 8-7), as represented by block 8-9, the method 800 includes determining whether or not one of the services provided to the subscriber is strained for capacity. If none of the other services are strained for capacity ("No" path from block 8-9), as represented by block 8-11, the method 800 includes temporarily permitting reallocation of a portion of the underutilized resource allocation to another client device and/or subscriber gateway. On the other hand, if at least one of the services provided to the subscriber is strained for capacity ("Yes" path from block 8-9), as represented by block 8-10, the method 800 includes reallocating a portion of the underutilized resource allocation to the service that is strained for capacity.

Figure 9A:
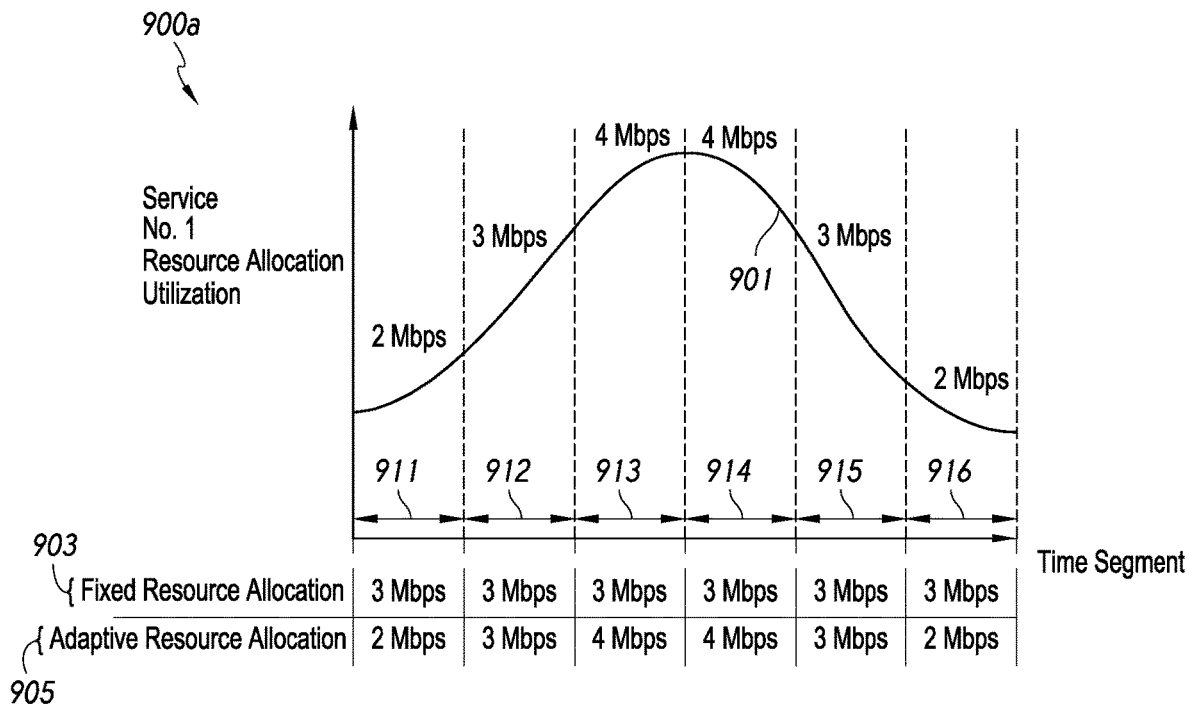
FIGS. 9A and 9B are performance diagrams illustrating reallocation of a network resource between services in accordance with some implementations.
Figure 9B:
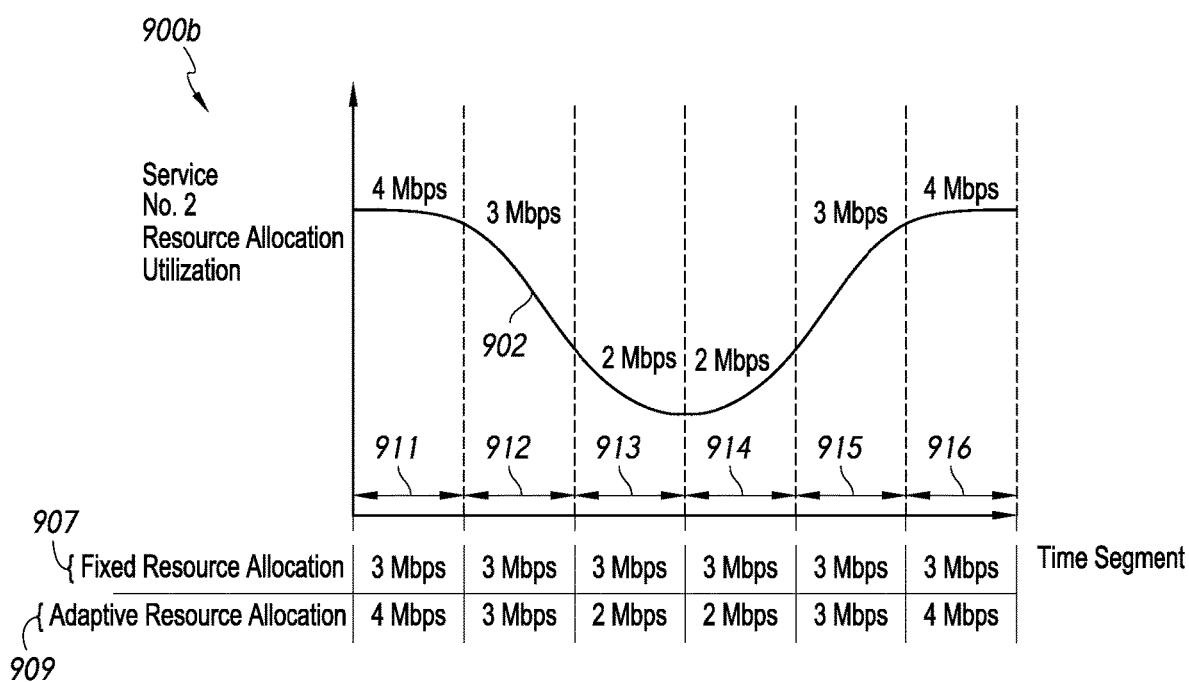

FIGS. 9A and 9B are performance diagrams 900a, 900b showing an example of reallocating portions of 6 Mbps of total bandwidth between first and second services provided to the same client device and/or subscriber gateway. While FIGS. 9A and 9B are illustrated and described herein with respect to two services and 6 Mbps of total bandwidth as an example, those of ordinary skill in the art will appreciate that various implementations include two or more services that share various available allocations of a network resource, such as bandwidth, processor time, memory, etc.

In accordance with previously known network management practices, FIG. 9A shows that, as an example, the first service is provided a fixed bandwidth allocation 903 of 3 Mbps over all of the temporal segments 911, 912, 913, 914, 915, 916. Similarly, FIG. 9B shows that, as an example, the second service is provided a fixed bandwidth allocation 907 of 3 Mbps over all of the temporal segments 911, 912, 913, 914, 915, 916, in accordance with previously known network management practices. More generally two or more services sharing a portion of bandwidth would each receive a fixed portion of the bandwidth, in accordance with previously known network management practices.

By contrast, in accordance with various implementations, FIG. 9A also provides an illustration of an adaptive bandwidth allocation 905 and its use 901 for the first service over the temporal segments 911, 912, 913, 914, 915, 916. Similarly, FIG. 9B also provides an illustration of an adaptive bandwidth allocation 909 and its use 902 for the second service over the temporal segments 911, 912, 913, 914, 915, 916. In some implementations, each of the temporal segments 911, 912, 913, 914, 915, 916 serves as a reallocation assessment period, during which the adaptive bandwidths allocations 905, 909 are evaluated as described above with respect to FIG. 8. In some implementations, at the end of each reallocation assessment period, the respective adaptive bandwidth allocations 905, 909 are adjusted so that bandwidth can be used more effectively by the combination of services provided to the client device and/or subscriber gateway.

Additionally and/or alternatively, in some implementations, the respective adaptive bandwidth allocations 905, 909, for at least some of the temporal segments, are assigned based on bandwidth demands of the respective service traffic associated with the first and second services. For example, during the first temporal segment 911, the first service is allocated 2 Mbps of bandwidth and the second service is allocated 4 Mbps of bandwidth. During the second temporal segment 912, the respective allocations are adjusted to 3 Mbps each based on substantially equal demand. During the third temporal segment 913, the respective allocations are adjusted so that the first service is allocated 4 Mbps and the second service is allocated 2 Mbps, corresponding to increases demand by the first service. During the fourth temporal segment 914, the respective allocations are not adjusted with respect to the third temporal segment 913, as demands 901, 902 are substantially the same as the previous temporal segment. However, during the fifth temporal segment 915, the second service demands more bandwidth, and the respective allocations are adjusted so that the first service is allocated 3 Mbps and the second service is allocated 3 Mbps. During the sixth temporal segment 916, the respective allocations are adjusted so that the first service is allocated 2 Mbps and the second service is allocated 4 Mbps.

Figure 10:
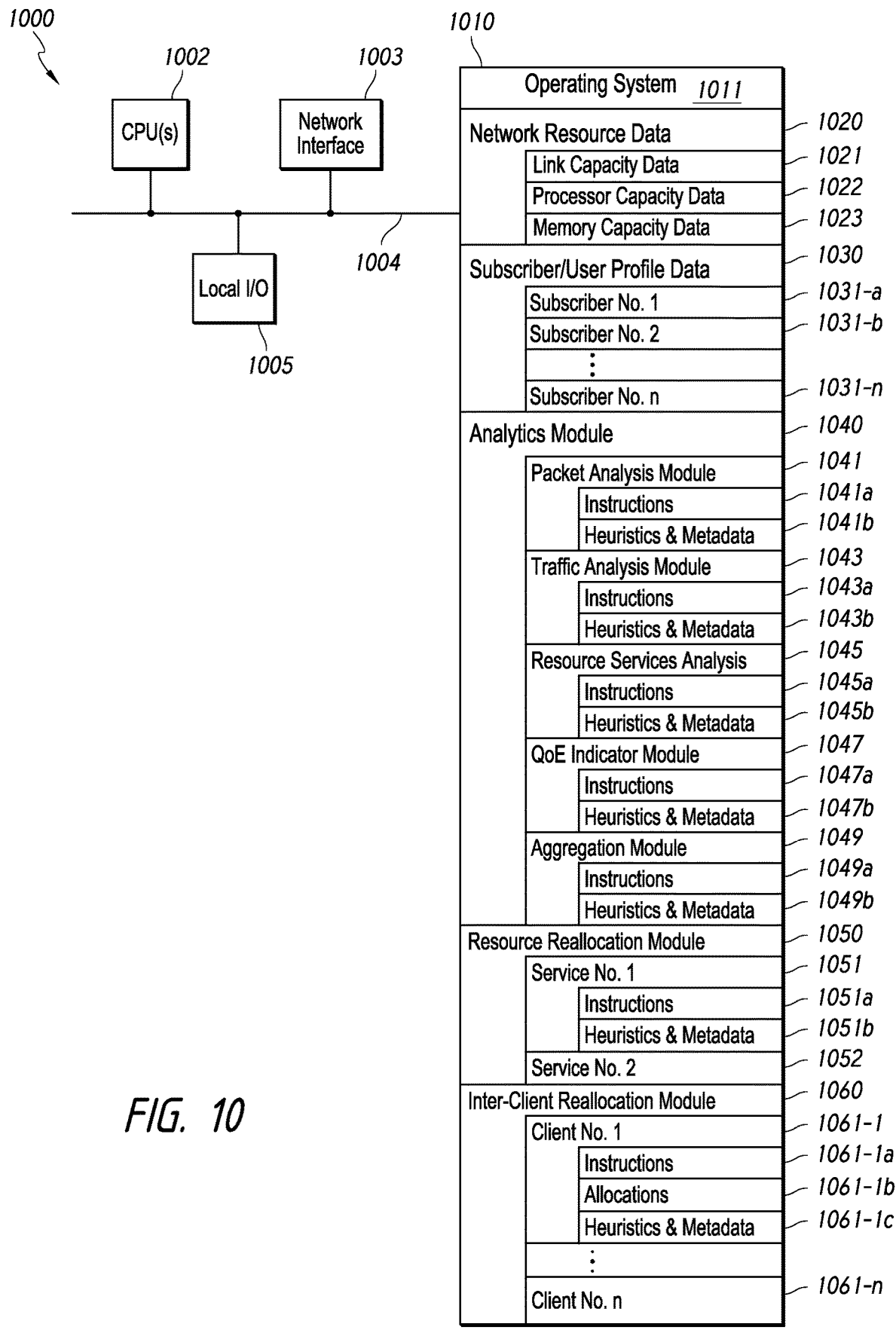
FIG. 10 is a block diagram of an example of a network resource management system in accordance with some implementations.

FIG. 10 is a block diagram of an example of a resource management system 1000 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the resource management system 1000 includes one or more processing units (CPU's) 1002, a network interface 1003, a memory 1010, a local I/O interface 1005, and one or more communication buses 1004 interconnecting the aforementioned and various other components.

In some implementations, the communication buses 1004 include circuitry that interconnects and controls communications between system components. The memory 1010 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 1010 optionally includes one or more storage devices remotely located from the CPU(s) 1002. The memory 1010 comprises a non-transitory computer readable storage medium. Moreover, in some implementations, the memory 1010 or the non-transitory computer readable storage medium of the memory 1010 stores the following programs, modules and data structures, or a subset thereof including an optional operating system 1011, network resource data 1020, subscriber/user profile data 1030, an analytics module 1040, a resource reallocation module 1050, and an inter-client reallocation module 1060.

The operating system 1011 includes procedures for handling various basic system services and for performing hardware dependent tasks.

In some implementations, the network resource data 1020 includes data associated with one or more shared network resources (e.g., bandwidth, processor time, memory, etc.). For example, as shown in FIG. 10, in some implementations, the network resource data 1020 includes link capacity data 1021, processor capacity data 1022, and memory capacity data 1023. In some implementations, the subscriber/user profile data 1030 includes data associated with one or more subscriber gateway devices and/or subscriber client devices 1031-*a*, 1031*b*, . . . , 1031-*n*. For example, as shown in FIG. 10, in some implementations, the subscriber/user profile data 1030 includes subscriber policy limits or the like for various client devices. In some implementations, subscriber policy limits include the various levels of service that define a subscription tier model. For example, service levels define priority tiers, data throughput ranges, data throughput floors or ceilings, and degradation policies associated with the subscription tier model.

In some implementations, the analytics module 1040 is configured to obtain and/or generate one or more shared-resource traffic quality indicator values, such as an aggregate QoE metric characterizing a distribution of QoE levels for each of the client devices sharing the one or more shared network resources as described above. As shown in FIG. 10, the analytics module 1040 includes a packet analysis module 1041, a traffic analysis module 1043, a resource services analysis module 1045, a QoE indicator module 1047, and an aggregation module 1049. In some implementations, the packet analysis module 1041 is configured to perform deep packet inspection of packets sent to and/or from client devices in order to determine at least one of encoding rates of segment representations and QoE indicator values as described above with reference to FIGS. 5 and 6. To that end, the packet analysis module 1041 includes instructions 1041*a*, and heuristics and metadata 1041*b*. In some implementations, the traffic analysis module 1043 is configured to at least one of monitor network traffic to and/or from client devices in order to generate resource allocation utilization values for corresponding client devices and/or subscriber gateways, and request and receive resource allocation utilization values from at least some client devices and/or subscriber gateways. To that end, the traffic analysis module 1043 includes instructions 1043*a*, and heuristics and metadata 1043*b*. In some implementations, the resource services analysis module 1045 is configured to determine relative resource utilization values for resource allocations provided for corresponding services as described above with reference to FIG. 8. To that end, the resource services analysis module 1045 includes instructions 1045*a*, and heuristics and metadata 1045*b*. In some implementations, the QoE indicator module 1047 is configured to assess QoE levels as described above with reference to FIGS. 5 and 6. To that end, the QoE indicator module 1047 includes instructions 1047*a*, and heuristics and metadata 1047*b*. In some implementations, the aggregation module 1049 is configured to determine aggregate QoE values as described above with reference to FIGS. 5 and 6. To that end, the aggregation module 1049 includes instructions 1049*a*, and heuristics and metadata 1049*b*.

In some implementations, the resource reallocation module 1050 is configured to reallocate network resource between two or more services provided to a particular client device and/or subscriber gateway as described above with reference to FIG. 8. In some implementations, the resource reallocation module 1050 includes a respective sub-module to manage each service. For example, as shown in FIG. 10, the resource reallocation module 1050 includes a first service sub-module 1051 and a second service sub-module 1052. Each service sub-module includes instructions and/or heuristics and metadata. For example, as shown in FIG. 10, the first service sub-module 1051 includes instructions 1051*a*, and heuristics and metadata 1051*b*.

In some implementations, the inter-client reallocation module 1060 is configured to reallocate network resources between two or more client devices and/or subscriber gateways as described above. In some implementations, the inter-client reallocation module 1060 includes a sub-module to manage each of the two or more client devices and/or subscriber gateways. For example, as shown in FIG. 10, the inter-client reallocation module 1060 includes client device sub-modules 1061-1, . . . , 1061-*n*. Each client device sub-module includes instructions, resource allocation data and/or heuristics and metadata. For example, the first client device sub-module 1061-1 includes instructions 1061-1*a*, allocation data 1061-1*b*, and heuristics and metadata 1061-1*c*.

In some implementations, a device and/or a circuit having one or more features described herein can be included in any number of communication devices. Such a device and/or a circuit can be implemented directly in the communication device, in a modular form as described herein, or in some combination thereof. In some embodiments, such a communication device can include, for example, a cellular phone, a smart-phone, a hand-held wireless device with or without phone functionality, a tablet, a router, an access point, a base station, a server, etc. That is, those skilled in the art will also appreciate from the present disclosure that in various implementations are included in various devices, such as a computer, a laptop computer, a tablet device, a netbook, an internet kiosk, a personal digital assistant, an optical modem, a base station, a repeater, a wireless router, a mobile phone, a smartphone, a gaming device, a computer server, or any other computing device. In various implementations, such devices include one or more processors, one or more types of memory, a display and/or other user interface components such as a keyboard, a touch screen display, a mouse, a track-pad, a digital camera and/or any number of supplemental devices to add functionality.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein. In another example, various portions of the disclosed methods may be practiced and/or performed in various sequences and/or combinations, including simultaneously.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
obtaining a plurality of quality of experience (QoE) level values from a plurality of client devices, each of the plurality of QoE level values being associated with a respective client device of the plurality of client devices and quantitatively characterizing perceptual playback quality of media content data associated with the respective client device;
determining allocations of a network resource for each of the plurality of client devices;
assessing a change to an aggregate QoE metric in response to a proposed reallocation of a portion of the network resource from a first client device of the plurality of client devices to a second client device of the plurality of client devices, wherein the portion of the network resource enabling the second client device to request a higher bitrate for the media content data, and wherein assessing the change to the aggregate QoE metric comprises:
determining that a decrease in a first QoE level associated with the first client device is lower than a first predetermined level,
determining that an increase in a second QoE level associated with second client device is greater than a second predetermined level, and
determining that the change in the aggregate QoE metric is within a degradation tolerance criteria, the change is the aggregate QoE metric determined based on the decrease in the first QoE level and the increase in the second QoE level; and
reallocating the portion of the network resource from the first client device to the second client device in response to assessing that the change to the aggregate QoE metric satisfies the degradation tolerance criterion.

2. The method of claim 1, further comprising determining whether to reallocate of the network resource between at least two of the plurality of client devices when the aggregate QoE metric substantially satisfies a performance criterion.

3. The method of claim 2, wherein the network resource includes bandwidth, processor time, and memory.

4. The method of claim 2, further comprising obtaining respective network resource allocations associated with the plurality of client devices.

5. The method of claim 4, wherein obtaining respective network resource allocations includes at least one of retrieving at least some of the respective network resource allocations from non-transitory memory, querying one of a device, system and module, and monitoring network traffic.

6. The method of claim 2, wherein determining whether or not to reallocate portions of the network resource includes assessing whether or not the aggregate QoE metric will diminish within an acceptable level as a result of reallocation.

7. The method of claim 2, wherein determining whether or not to reallocate portions of the network resource includes assessing whether or not reallocation will improve the aggregate QoE metric.

8. The method of claim 2, wherein determining whether or not to reallocate portions of the network resource includes assessing whether or not a reallocation will substantially satisfy at least one of a network operator policy and a subscriber policy.

9. The method of claim 1, wherein obtaining the plurality of QoE level values includes determining encoding rates of media content data streams available to be transmitted to the plurality of client devices.

10. The method of claim 9, wherein determining encoding rates includes at least one of retrieving at least some of the encoding rates from a non-transitory memory, querying at least some of the plurality of client devices, performing deep packet inspection of data packets associated with at least some of the client devices.

11. The method of claim 1, further comprising selecting a reallocation period during which respective resource allocations for corresponding client devices are evaluated based on associated QoE level values.

12. The method of claim 1, further comprising identifying the first client device and the second client device.

13. The method of claim 12, wherein the first client device is instructed to select higher rate segment representations in response to the reallocation.

14. The method of claim 12, further comprising limiting a number of reallocation of the portions of the network resources for the reallocation period.

15. The method of claim 1, wherein obtaining the plurality of QoE level values comprises retrieving QoE level values from a memory storing the plurality of QoE level values in relation to various portions of media content data.

16. The method of claim 1, wherein obtaining the plurality of QoE level values comprises acquiring a quality metric associated with respective data segments associated with corresponding client devices.

17. The method of claim 1, wherein obtaining the plurality of QoE level values comprises determining QoE level values based at least on resource allocations provided to particular client devices and encoding rates associated media content data and particular client devices.

18. An apparatus comprising:
a processor; and
a memory including instructions which when executed by the processor configure the processor to:
obtain a plurality of quality of experience (QoE) level values from a plurality of client devices, each of the plurality of QoE level values being associated with a respective client device and quantitatively characterizing perceptual playback quality of media content data associated the respective client device;
determine allocations of a network resource for each of the plurality of client devices;
assess a change to an aggregate QoE metric in response to a proposed reallocation of a portion of a network resource from a first client device of the plurality of client devices to a second client device of the plurality of client devices, wherein the portion of the network resource enabling the second client device to request a higher bitrate for the media content data, and wherein the processor being configured to assessing the change to the aggregate QoE metric comprises the processor being configured to:
determine that a decrease in a first QoE level associated with the first client device is lower than a first predetermined level;
determine that an increase in a second QoE level associated with second client device is greater than a second predetermined level, and
determine that the change in the aggregate QoE metric is within a degradation tolerance criteria, the change is the aggregate QoE metric determined based on the decrease in the first QoE level and the increase in the second QoE level; and
reallocate the portion of the network resource from the the first client device to the second client device using the determined allocations of the network resource based on the aggregate QoE metric in response to assessing that the change to the aggregate QoE metric satisfies the degradation tolerance criterion.

19. A non-transitory comprising instructions which when executed perform a method comprising:
obtaining a plurality of quality of experience (QoE) level values from a plurality of client devices, each QoE level value being associated with a respective client device of the plurality of client devices;
assessing a change in an aggregate QoE metric in response to a proposed reallocation of a portion of a network resource reallocation from a first client device of the plurality of client devices to a second client device of the plurality of client devices, wherein the portion of the network resource enabling the second client device to request a higher bitrate for the media content data, and wherein assessing the change to the aggregate QoE metric comprises:
determining that a decrease in a first QoE level associated with the first client device is lower than a first predetermined level;
determining that an increase in a second QoE level associated with second client device is greater than a second predetermined level, and
determining that the change in the aggregate QoE metric is within a degradation tolerance criteria, the change is the aggregate QoE metric determined based on the decrease in the first QoE level and the increase in the second QoE level; and
perform the network resource reallocation between the first client device and the second client device based on assessing that the network resource reallocation improves or adjusts the aggregate QoE metric to satisfy the degradation tolerance criterion.

* * * * *